United States Patent [19]

Hubbard

[11] Patent Number: 5,170,558
[45] Date of Patent: Dec. 15, 1992

[54] RECEIVING ARM FOR A WOODEN TRUSS FABRICATION SYSTEM AND SYSTEM

[75] Inventor: Terry W. Hubbard, Indianapolis, Ind.

[73] Assignee: Klaisler Mfg. Corp., Indianapolis, Ind.

[21] Appl. No.: 854,324

[22] Filed: Mar. 19, 1992

[51] Int. Cl.⁵ .................................................. B23P 11/00
[52] U.S. Cl. ................................. 29/897.31; 29/795; 29/798; 227/39
[58] Field of Search .................... 29/897.31, 897.312, 29/795, 798, 822, 432, 432.1; 100/173, 193; 227/39, 44, 154, 152

[56] References Cited

U.S. PATENT DOCUMENTS

| | | | |
|---|---|---|---|
| 2,996,721 | 8/1961 | Black | 29/897.31 X |
| 3,068,483 | 12/1962 | Moehlenpah | 29/897.31 X |
| 3,068,484 | 12/1962 | Moehlenpah . | |
| 3,100,301 | 8/1963 | Black | 29/897.31 X |
| 3,244,091 | 9/1964 | Anderson . | |
| 3,375,778 | 4/1968 | Newman . | |
| 3,413,703 | 12/1968 | Sanford | 29/897.31 |
| 3,709,762 | 9/1970 | Chandler . | |
| 4,005,520 | 2/1977 | Sanford . | |
| 4,304,046 | 12/1981 | McDonald . | |
| 4,373,652 | 3/1983 | Matlock . | |
| 4,567,821 | 2/1986 | McDonald . | |
| 4,841,852 | 6/1989 | Kubiak . | |

Primary Examiner—Timothy V. Eley
Attorney, Agent, or Firm—Woodard, Emhardt, Naughton Moriarty & McNett

[57] ABSTRACT

A receiving arm for a fabrication system for mass assembly of wooden trusses by joining the truss members with unitized plate fasteners in preliminary and final assembly areas. A gantry pinch roller is used in the preliminary assembly area for preliminary pressing of the fasteners to the truss members, whereas a stationary truss pinch roller is used in the final assembly area for final pressing of the fasteners to the truss members. A plurality of receiving arms are employed to transfer trusses between the first and second assembly areas. The receiving arms employ cammed movement paths which minimize the risk that trusses will be twisted during transfer by any nonsynchronous movement among the arms.

12 Claims, 6 Drawing Sheets

RECEIVING ARM FOR A WOODEN TRUSS FABRICATION SYSTEM AND SYSTEM

BACKGROUND OF THE INVENTION

1. Field of the Invention

The present invention relates to systems for the fabrication of wooden trusses and, more particularly, to a receiving arm used to catch trusses and set trusses as part of their transfer between adjacent truss fabrication assembly lines.

2. Description of the Prior Art

A method for fabricating wooden trusses which has been well known for many years involves having the butt joints of each truss secured with unitized toothed metal fasteners or connectors. One such system for the mass fabrication of wooden trusses uses jigs to position the truss members in place on working tables forming a first assembly area. Unitized fasteners are placed on either side of the butt joints and the truss members tacked together by pressing the fasteners into the truss members using a gantry pinch roller. Once tacked, the trusses are laterally transferred to a second conveyor area by a plurality of spaced apart receiving arms. The trusses are then conveyed to a stationary truss pinch roller via conveyor rollers for final pressing of the unitized fasteners so as to firmly embed the fasteners within the butt joints.

Because the trusses are often quite large, they are supported by three or more spaced apart receiving arms. It is conventional that the receiving arms are pivotally mounted to their supports and actuated by pneumatic pistons along arcuate paths dictated by the length of their pivot arms. Ideally, the receiving arms are actuated in unison, however sometimes the receiving arms fail to move in concert with one another. When this happens a portion of the truss being conveyed can slip or be lifted relative to other portions, with the result that the truss is twisted and the securement of the butt joints compromised.

SUMMARY OF THE INVENTION

According to one aspect of the present invention there is provided a receiving arm for a wooden truss fabrication system having first and second assembly areas for assembling wooden trusses by joining respective truss members with unitized plate fasteners, a gantry pinch roller associated with the first assembly area for preliminary pressing of the fasteners to the truss members, and a stationary truss pinch roller associated with the second assembly area for final pressing of the fasteners to the truss members. The receiving arm of the present invention is operable to transfer trusses between the first and second assembly areas and is characterized by a base, an elongate arm movably supported by the base in a horizontally extending orientation, an anti-friction bearing means extending along the length of the arm for directly supporting the trusses, an actuation means for actuating reciprocal movement of the arm relative to the base, and a connecting means for connecting the arm to the base. The connecting means may be characterized as having a cam follower thereon and the base having a cam surface for imparting motion to the cam follower which thereby imparts corresponding movement to the arm. In addition, the cam surface has a first surface portion which imparts horizontal movement only to the cam follower and a second surface portion which imparts a movement path to the cam follower having a vertical movement component.

According to a further aspect of the present invention there is provided a wooden truss fabrication system characterized by first and second assembly areas for assembling wooden trusses by joining respective truss members with unitized plate fasteners, a gantry pinch roller associated with the first assembly area for preliminary pressing of the fasteners to the truss members, a stationary truss pinch roller associated with the second assembly area for final pressing of the fasteners to the truss members, and a plurality of receiving arms operably associated with the first and second assembly areas to transfer trusses therebetween. Each of the receiving arms may be characterized as having a base, an elongate arm movably supported by the base in a horizontally extending orientation, an anti-friction bearing means extending along the length of the arm for directly supporting the trusses, an actuation means for actuating reciprocal movement of the arm relative to the base, and a connecting means for connecting the arm to the base. Further, the connecting means has a cam follower thereon and the base has a cam surface for imparting motion to the cam follower which thereby imparts a corresponding movement to the arm. In addition, the cam surface has a first surface portion which imparts horizontal movement only to the cam follower and a second surface portion which imparts a movement path to the cam follower having a vertical movement component.

Accordingly, it is an object of the present invention to provide an improved receiving arm for a wooden truss fabrication system.

An additional object of the present invention is to provide an improved receiving arm which does not cause twisting of the trusses as they are transferred between assembly areas should the receiving arm become slightly out of sync with the movement of other receiving arms.

It is a further object of the present invention to provide an improved wooden truss fabrication system.

Related objects and advantages of the present invention will become even more apparent by reference to the following figures and detailed description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
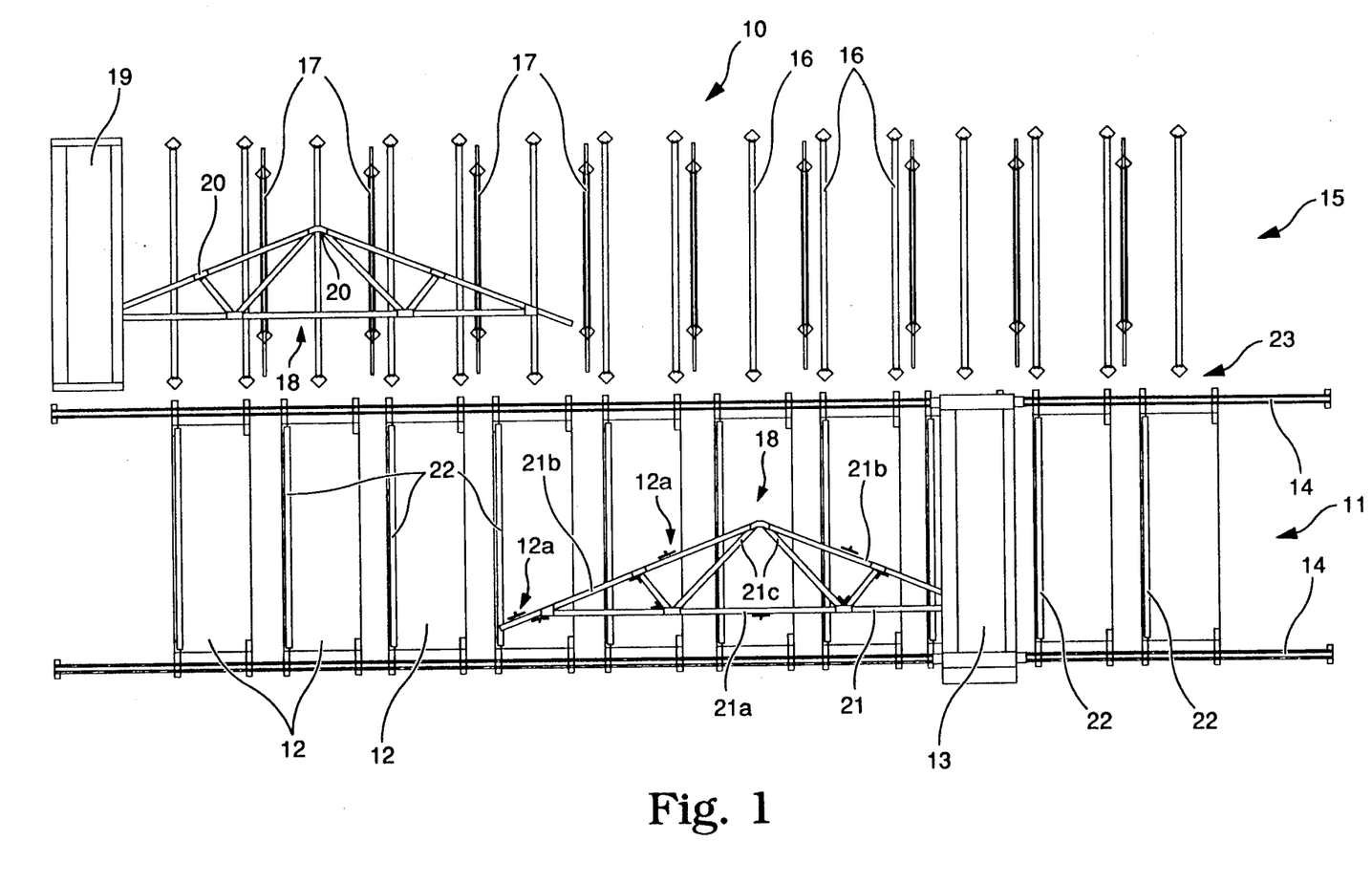
FIG. 1 is a top plan view showing the wooden truss fabrication system of the present invention.

Referring now to the drawings in detail, there is shown generally at 10 in FIG. 1 a preferred embodiment of the wooden truss fabrication system of the present invention. The system 10 includes a preliminary truss assembly area 11 comprising a plurality of spaced apart tables 12, a gantry pinch roller 13 movable across tables 12 on tracks 14, a conveyor area 15 including a plurality of spaced apart conveyor rollers 16, a plurality of receiving arms 17 for transferring trusses 18 laterally from the preliminary truss assembly area 11 to the conveyor area 15, and a stationary truss pinch roller 19.

Figure 8:
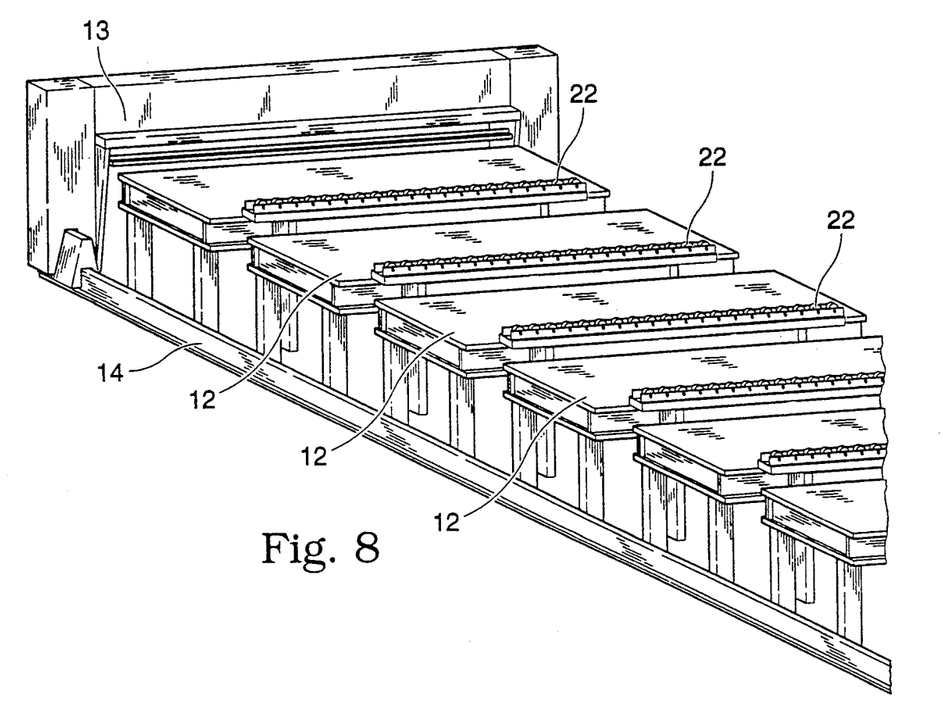
FIG. 8 is a fragmentary perspective view depicting a portion of the stationary truss pinch roller and the conveyor assembly area with the skate rails in their vertically raised positions.
Figure 9:
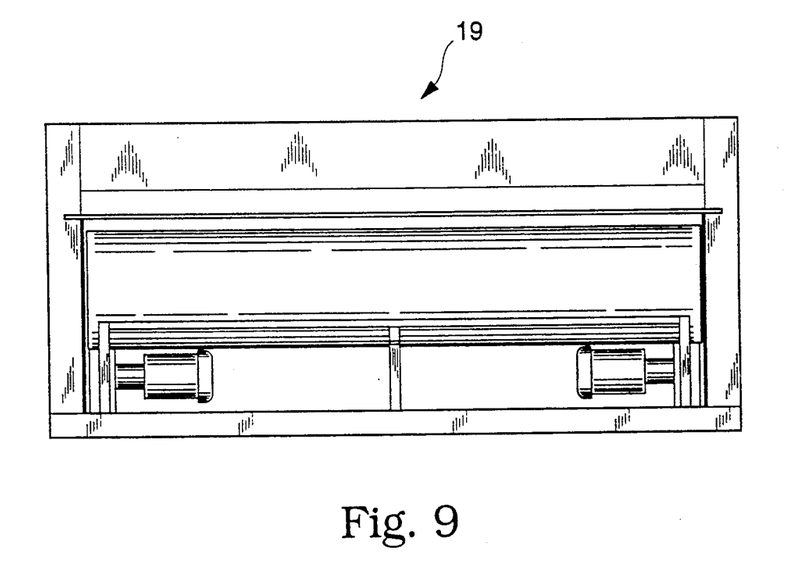
FIG. 9 is an elevation view of the stationary truss pinch roller.

The specific construction and operation of the gantry pinch roller 13 and stationary truss pinch roller 19, shown more fully in FIGS. 8 and 9 respectively, is not crucial to the present invention. They may acceptably be any type well known in the art and for this reason need not be described herein. Of these, those most preferred are of the type employed in the Roof Truss Gantry System currently manufactured by Klaisler Mfg. Corp. of Indianapolis, Ind.

The particular truss 18 shown in FIG. 1 is a W-type roof truss of exemplary design including a plurality of wooden truss members 21 including a lower chord 21a, upper sloping chords 21b, and web members 21c. Depending upon the size of the truss, any of the truss members may be formed of one continuous member, or alternatively, two or more members spliced end to end. The various members are secured together by butt joints fastened together by perforated metal fastener plates 20 having a unitized design well known in the art which serve the same function as nails. It should be appreciated that the plates 20 are employed on each side of the joints.

In assembly the truss members 21, which have been previously cut to the desired size and shape, are laid on the tables 12 and manually positioned together employing jigs 12a pre-mounted on the tables 12. Plates 20 are laid over and under the truss members at the joints formed by the butting together of the respective truss members. With the truss members 21 thusly jigged in position, the gantry pinch roller 13 is actuated to roll over the truss on tracks 14 and press the plates 20 so as to partially embed them into the butt joints. Extending along the margins of each of the tables 12 are a pair of receiving skate rails 22 which are pneumatically actuated to pop up and thereby lift the truss 18 vertically up from the tables 12 so as to clear the jigs 12a. A plurality of receiving arms 17 having the inventive features of the present invention are located at suitably spaced apart positions between conveyor rollers 16. Once the truss 18 is lifted on skate rails 22, the receiving arms 17 are pneumatically actuated to extend from the conveyor area 15 and span the space 23 between the assembly and conveyor areas 11 and 15 respectively, thereby permitting workers to laterally transfer the truss 18 from the skate rails 22 to the receiving arms 17. Because the topmost portions of the receiving arms 17 are normally positioned vertically below the top of the conveyor rollers 16 so as not to interfere with the eventual movement of trusses 18 on rollers 16, part of their movement path requires their being raised vertically above the rollers 16. In addition, the receiving arms 17 are raised to a height which is Preferably at, but not above, the height of the skate rails 22 in their fully raised positions so as to permit the partially fastened together truss 18 to be moved laterally onto the receiving arms without possibility of bending. The receiving arms 17 are then actuated to retract back to their original positions, and thereby transfer the truss 18 onto the conveyor rollers 16 of the conveyor area 11 where motorized ones of conveyor rollers 16 are actuated to move the truss into the stationary truss pinch roller 19 for final pressing of the plates 20 into the truss members 21 in a well known manner.

Figure 7:
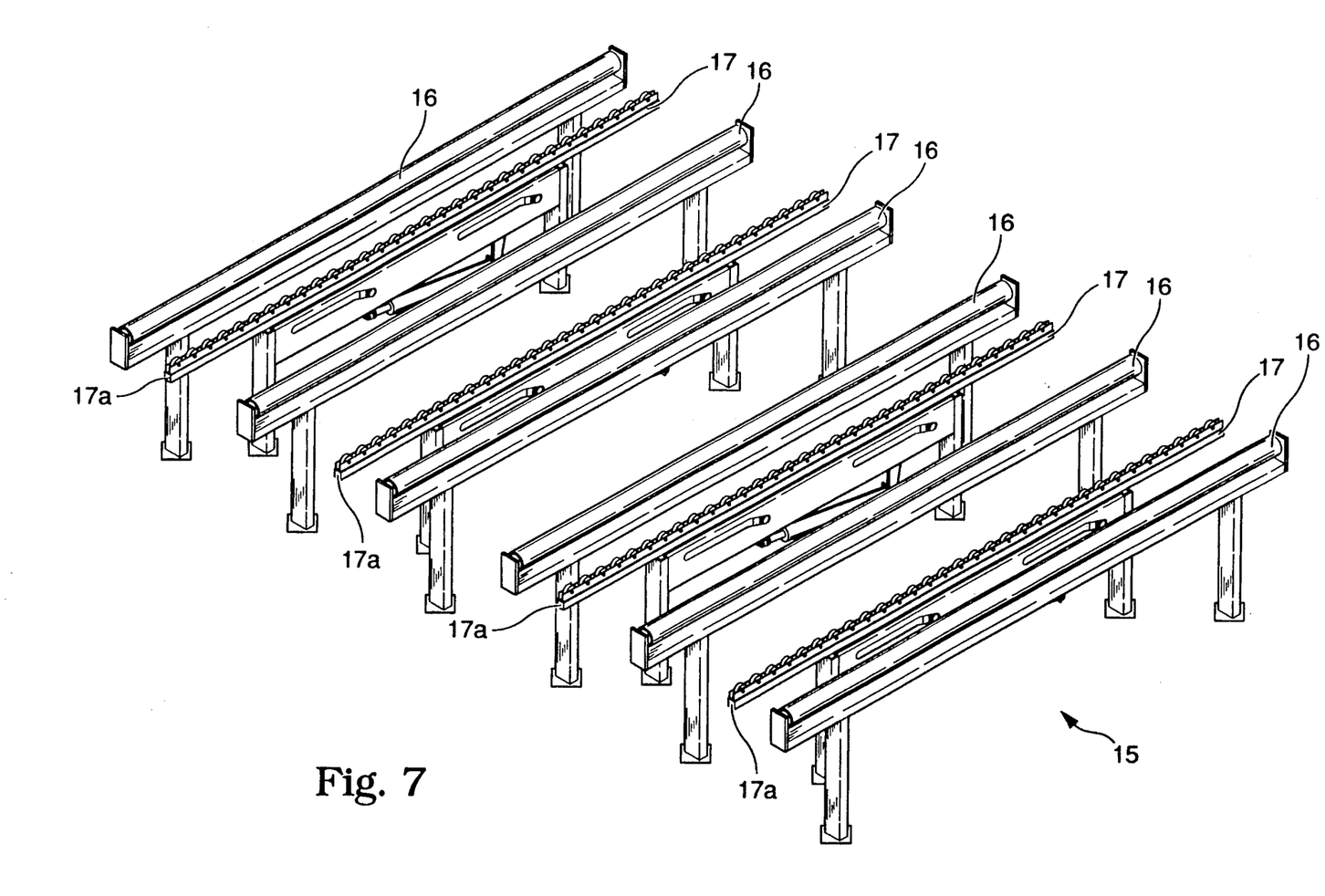
FIG. 7 is a fragmentary perspective view depicting a portion of the conveyor assembly area and showing the receiving arms of FIG. 4 in their fully retracted positions.

Although the precise construction of the receiving arms 17 will be fully discussed later herein, it should be appreciated that when not in operation the receiving arms 17 are positioned as shown in FIGS. 1 and 7 so that their leading edges 17a do not extend into the space 23 between the preliminary assembly area 11 and the conveyor area 15. This permits easier access by workers to space 23 and frees up space 23 for use in stacking truss members 18 for assembly on tables 12.

Figure 2:
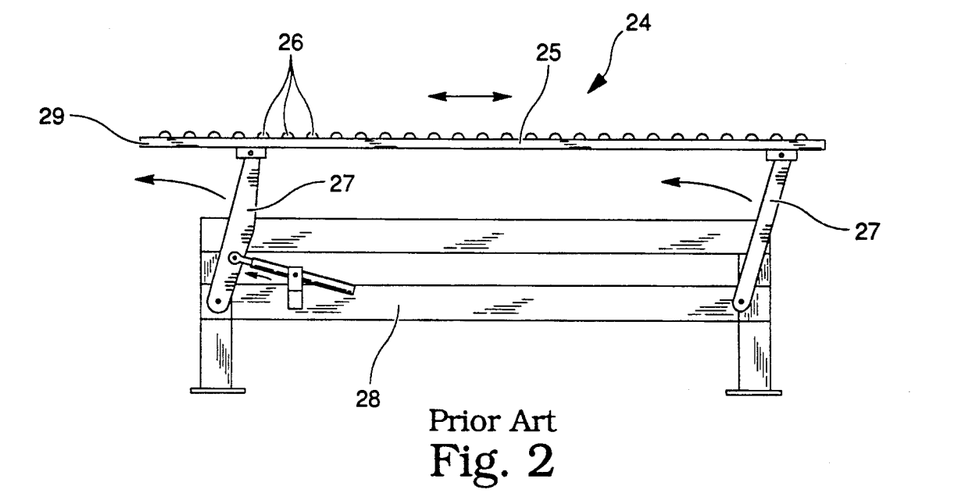
FIG. 2 is an elevation view of a prior art type receiving arm used in a wooden truss fabrication system.
Figure 5:
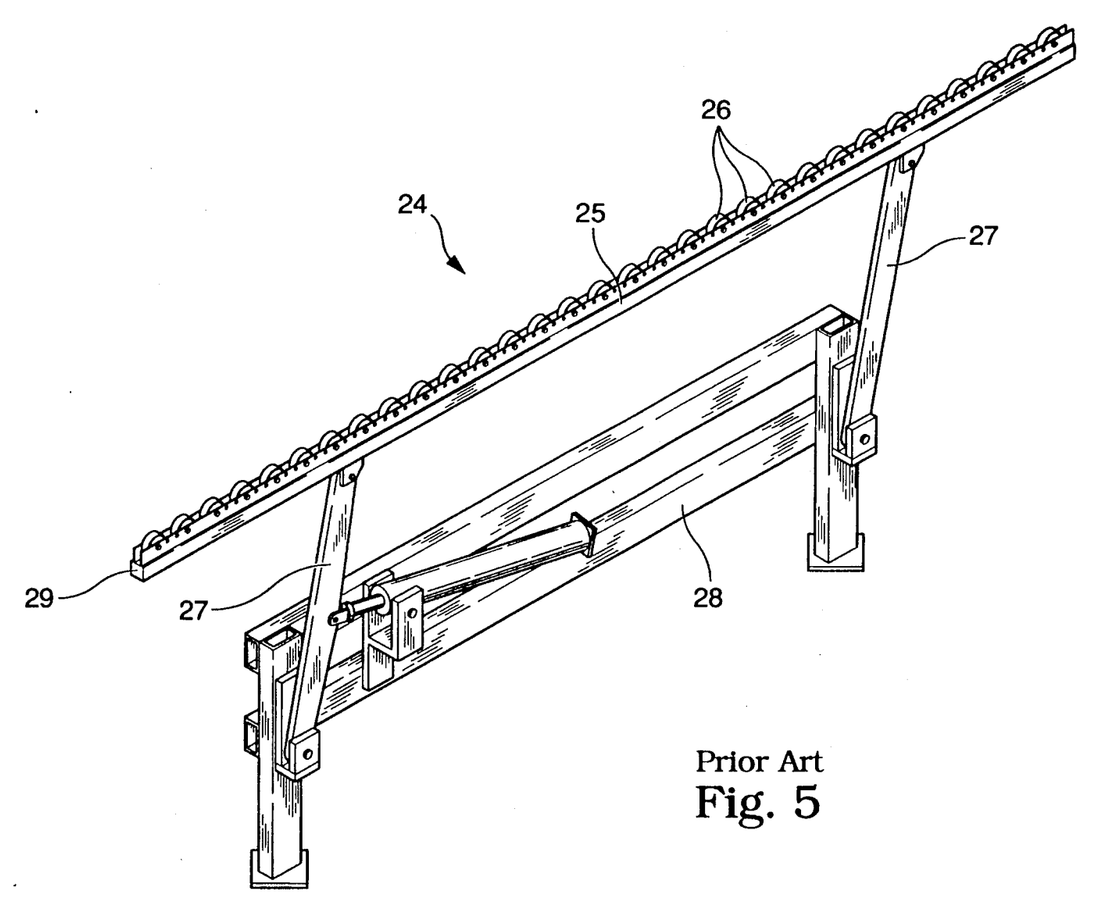
FIG. 5 is a perspective view of the prior art receiving arm of FIG. 2.

FIGS. 2 and 5 show a receiving arm 24 of a type previously known in the art. At the top of the receiving arm 24 is a horizontally disposed elongate roller track 25 including a plurality of rollers 26. The rollers 26 serve to facilitate the lateral transfer of the truss from the assembly area 11 to the conveyor area 15. Roller track 25 is mounted on a pair of pivot arms 27 which are in turn pivotally mounted to a stationary support base 28.

Figure 3A:
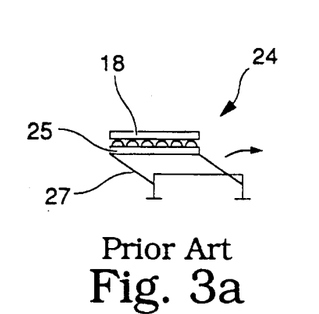
FIGS. 3a–c are schematic representations of the prior art type receiving arm of FIG. 1 showing the arcuate movement path of the roller track.
Figure 3B:
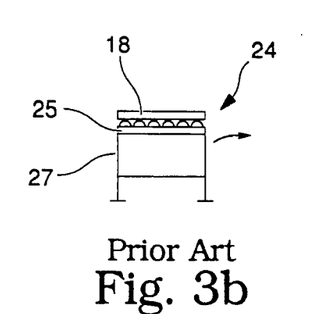
Figure 3C:
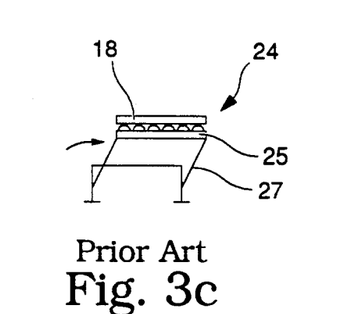

As can be more fully appreciated by reference to FIGS. 3a-c, the movement path of the roller track 25 is arcuate. Therefore, if there is any asynchronous movement among any of the receiving arms the roller tracks 25 will not all be at the same height. This condition is not necessarily critical as the receiving arms 17 extendably travel towards the assembly area 11 because during this portion of their actuation the receiving arms are not carrying a truss 18. However, any vertical misalignment of the roller tracks 25 during their retraction to conveyor area 15 can cause the truss 18 to bend and twist, with the result that the butt joints of truss 18, which is only partially fastened together by plates 20, will become loosened. This problem is especially apparent when the roller tracks 25 are at the high end of their movement path and when the truss 18 is located over the space 23 between tables 12 and conveyor rollers 16, for during this period of travel any bending or twisting of the truss 18 has the opportunity to become most pronounced. In addition, the range of movement of the roller track 25 of the receiving arm 24 in a horizontal direction is necessarily dependent upon the length of the pivot arms 27. Because the range of movement in a vertical direction is also dependent on the length of arms 27 and it is desirable to limit this vertical movement, there are practical limits on the amount of lateral movement of which the roller track is capable. The result is that the space 23 between the assembly area 11 and the conveyor area 15 must be made undesirably narrow and the leading edge 29 of the roller track 25 must be positioned to extend substantially into the space 23 when the receiving arm 24 is in its fully retracted position, thus further limiting the accessability and usability of this space.

Figure 4:
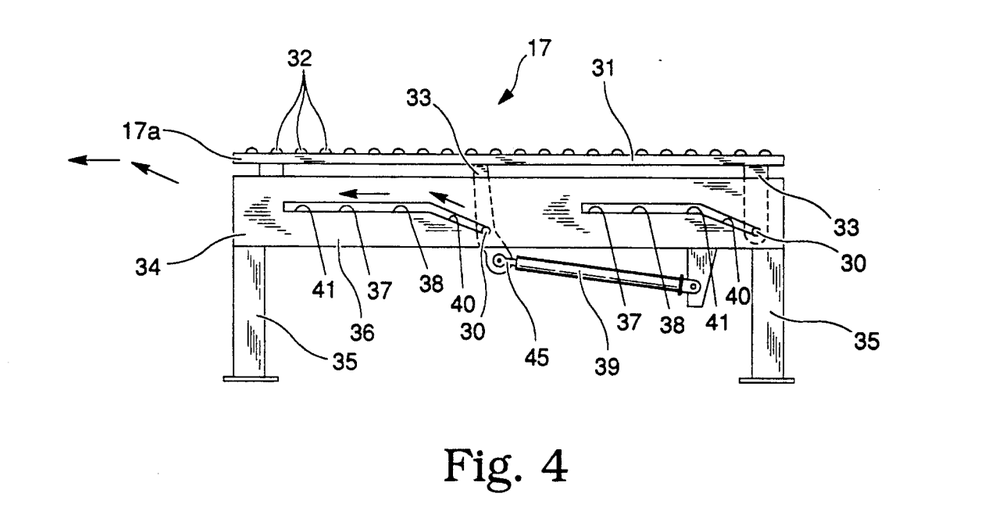
FIG. 4 is an elevation view of the receiving arm of the present invention used in wooden truss fabrication system of FIG. 1.
Figure 6:
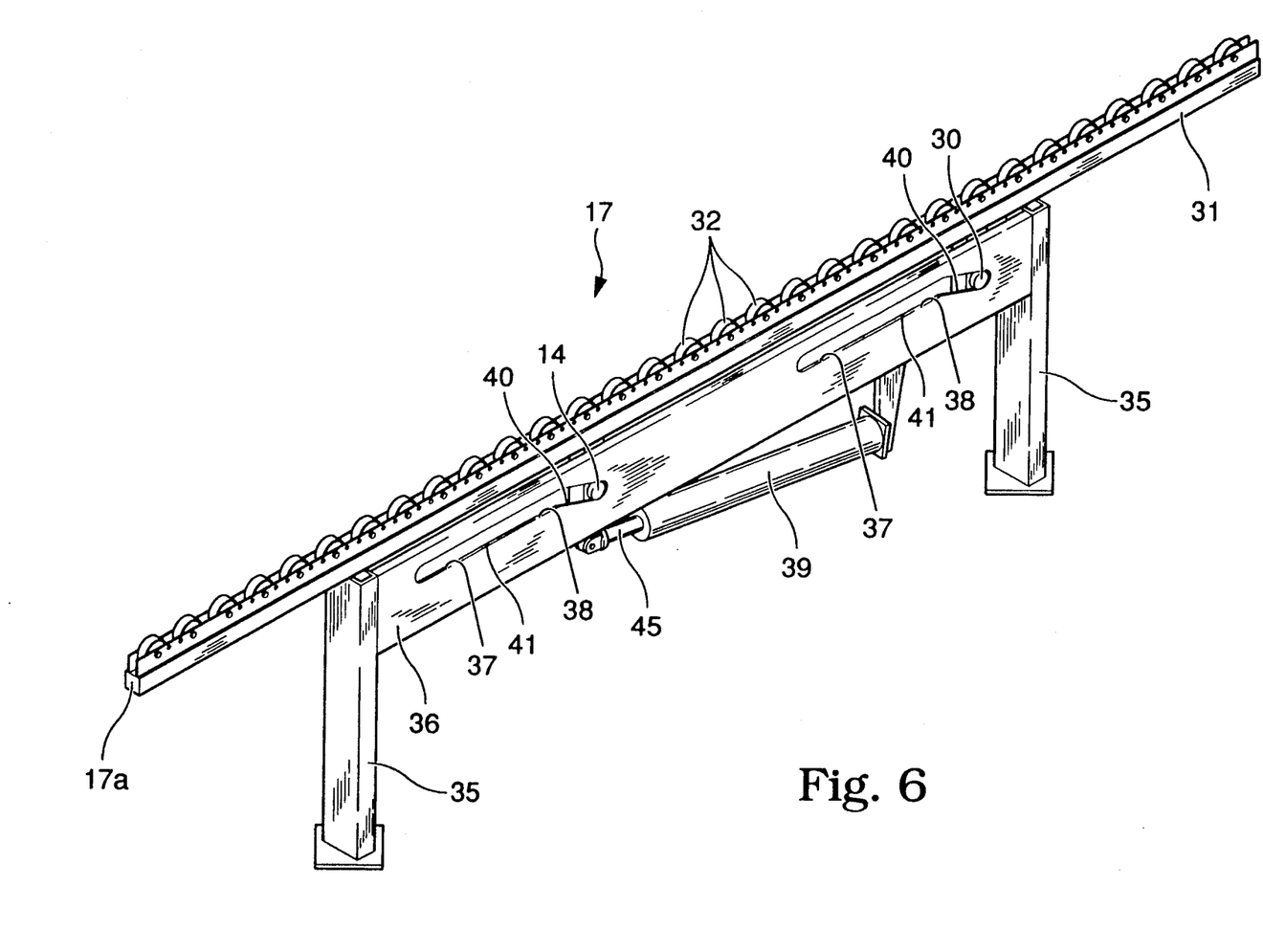
FIG. 6 is a perspective view of the receiving arm of FIG. 4.

Referring now to FIGS. 4 and 6, there is shown a receiving arm 17 of the present invention. The receiving arm 17 includes a horizontally disposed elongate roller track 31 having a plurality of anti-friction rollers 32. Similarly to rollers 26 of arm 24 previously described, the rollers 32 serve to facilitate the lateral transfer of the truss from the assembly area 11 to the conveyor area 15. Rigidly fixed to and extending downwardly from roller track 31 are a pair of vertically disposed support members 33 upon which are each mounted a roller 30. The rollers 30 are movably supported on a stationary support base 34 which comprises a pair of vertically extending legs 35 and a horizontally disposed web 36. The web 36 defines a pair of identically formed slots 37 which are each shaped to define a cam surface 38 against which rollers 30 bear. The rollers 30 thus serve as cam followers to impart a desired movement path to roller track 31 while maintaining the roller track in a horizontally disposed orientation. Movement of cam follower rollers 30 are actuated by a pneumatic cylinder 39 pivotally connected at one end to base 34 and at the other end by piston rod 45 to the left one of members 33.

Each cam surface 38 has a ramped surface portion 40 which inclines upwardly from right to left in FIG. 4 and a horizontal surface portion 41. When the arm 17 is in the fully retracted position shown in FIG. 7, rollers 30 will be positioned at the bottom of ramped surface portion 40 and roller track 31 will be positioned slightly below the conveyor rollers 16. In order to minimize the possibility of bending or twisting of a truss 18 during the lateral transfer step previously described, it is desirable that the portion of the total travel during which the roller track 31 moves only in a horizontal direction be substantially greater than the ramped portion of the total travel during which there is a vertical movement component. In the preferred embodiment which is shown, the horizontal surface portion 41 extends for approximately 30 inches (76.2 cm.), whereas the inclined surface component extends for approximately 12 inches (30.5 cm.). In addition, the total vertical travel imparted by the ramped surface portion 40 is approximately 4 inches (10.1 cm.).

It should be appreciated that during the portion of the travel of receiving arms 17 which takes place over the space 23, any asynchronous movement among the receiving arms will not result in the receiving arms being at different heights because they will still be in the horizontal only portion of their movement paths. By the time the arms 17 begin their descent to lay the truss 18 down onto the conveyor rollers 16, the truss 18 will already be substantially positioned over the rollers 16, with the result that any bending of truss 18 will be for the most part limited by contact with rollers 16.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A receiving arm for a wooden truss fabrication system having first and second assembly areas for assembling wooden trusses by joining respective truss members with unitized plate fasteners, a gantry pinch roller associated with the first assembly area for preliminary pressing of the fasteners to the truss members, and a stationary truss pinch roller associated with the second assembly area for final pressing of the fasteners to the truss members, said receiving arm being operable to transfer trusses between the first and second assembly areas and comprising:
   a base;
   an elongate arm movably supported by said base in a horizontally extending orientation;
   an anti-friction bearing means extending along the length of said arm for directly supporting said trusses;
   an actuation means for actuating reciprocal movement of said arm relative to said base; and
   a connecting means for connecting said arm to said base, said connecting means having a cam follower thereon, said base having a cam surface for imparting motion to said cam follower and thereby imparting corresponding movement to said arm, said cam surface having a first surface portion which imparts horizontal movement only to said cam follower and a second surface portion which imparts a movement path to said cam follower having a vertical movement component.

2. The receiving arm of claim 1 wherein said first cam surface portion subscribes a greater portion of the movement path of said cam follower than said second cam surface portion.

3. The receiving arm of claim 2 wherein said actuation means includes an pneumatically actuated cylinder and piston rod reciprocally movable relative to said cylinder, said cylinder being pivotally connected at one end to said base and at the other end to said connecting means.

4. The receiving arm of claim 2 wherein said connecting means includes a plurality of support members rigidly connected to said arm and a cam follower mounted to each of said support members, and wherein said base defines a plurality of slots, each said slot defining said cam surface and receiving therein a corresponding one of said cam followers.

5. The receiving arm of claim 4 wherein each said cam follower is an anti-friction roller.

6. The receiving arm of claim 1 wherein said second cam surface portion includes a ramped surface which is inclined relative to said first cam surface.

7. A wooden truss fabrication system, comprising:
   first and second assembly areas for assembling wooden trusses by joining respective truss members with unitized plate fasteners;
   a gantry pinch roller associated with the first assembly area for preliminary pressing of the fasteners to the truss members,
   a stationary truss pinch roller associated with the second assembly area for final pressing of the fasteners to the truss members; and
   a plurality of receiving arms operably associated with said first and second assembly areas to transfer trusses therebetween, each of said receiving arms having a base, an elongate arm movably supported by said base in a horizontally extending orientation, an anti-friction bearing means extending along the length of said arm for directly supporting said trusses, an actuation means for actuating reciprocal movement of said arm relative to said base, and a connecting means for connecting said arm to said base, said connecting means having a cam follower thereon, said base having a cam surface for imparting motion to said cam follower and thereby imparting corresponding movement to said arm, said cam surface having a first surface portion which imparts horizontal movement only to said cam follower and a second surface portion which imparts a movement path to said cam follower having a vertical movement component.

8. The receiving arm of claim 7 wherein said first cam surface portion subscribes a greater portion of the movement path of said cam follower than said second cam surface portion.

9. The receiving arm of claim 8 wherein said second cam surface portion includes a ramped surface which is inclined relative to said first cam surface.

10. The receiving arm of claim 9 wherein said actuation means includes an pneumatically actuated cylinder and piston rod reciprocally movable relative to said cylinder, said cylinder being pivotally connected at one end to said base and at the other end to said connecting means.

11. The receiving arm of claim 10 wherein said connecting means includes a plurality of support members rigidly connected to said arm and a cam follower mounted to each of said support members, and wherein said base defines a plurality of slots, each said slot defining said cam surface and receiving therein a corresponding one of said cam followers.

12. The receiving arm of claim 11 wherein each said cam follower is an anti-friction roller.

* * * * *

UNITED STATES PATENT AND TRADEMARK OFFICE
CERTIFICATE OF CORRECTION

PATENT NO. : 5,170,558
DATED : December 15, 1992
INVENTOR(S) : Terry W. Hubbard

It is certified that error appears in the above-identified patent and that said Letters Patent is hereby corrected as shown below:

On the title page, item (54) in the title, delete "AND SYSTEM".
Column 1, line 2, delete "AND SYSTEM".

In Column 4, at line 11, "Preferably" should read --preferably--.

Signed and Sealed this

First Day of February, 1994

Attest:

BRUCE LEHMAN

Attesting Officer    Commissioner of Patents and Trademarks